United States Patent [19]

Jurek

[11] 4,282,417
[45] Aug. 4, 1981

[54] METHOD FOR CONTROLLING MAGNETIZING CURRENT IN MULTIPULSE RESISTANT WELDING

[75] Inventor: Dennis J. Jurek, Grafton, Wis.

[73] Assignee: Square D Company, Palatine, Ill.

[21] Appl. No.: 956,138

[22] Filed: Oct. 30, 1978

[51] Int. Cl.³ ............................................. B23K 11/24
[52] U.S. Cl. .................................... 219/116; 323/345
[58] Field of Search ......................... 323/6, 58, 24, 34; 219/108, 114, 116

[56] References Cited

U.S. PATENT DOCUMENTS

| | | | |
|---|---|---|---|
| 2,440,247 | 4/1948 | Dawson | 323/58 |
| 2,802,146 | 8/1957 | Van Ness | 219/116 |
| 3,079,547 | 2/1963 | Porter | 323/58 |
| 3,167,704 | 1/1965 | Maag | 323/58 |
| 3,171,079 | 2/1965 | Mierendorf et al. | 323/58 |
| 3,444,455 | 5/1969 | Johnson et al. | 323/58 |
| 3,445,620 | 5/1969 | Littwin et al. | 219/108 |
| 3,714,545 | 1/1973 | Chiffert | 323/6 |
| 4,104,724 | 8/1978 | Dix et al. | 219/108 |

*Primary Examiner*—C. C. Shaw
*Attorney, Agent, or Firm*—Michael J. Femal

[57] ABSTRACT

A method to control the welding transformer residual magnetizing current which normally continues circulating in the secondary circuit at the end of each welding pulse until the tips are opened. By utilizing a firing delay of the last half cycle in each welding pulse that brings the algebraic sum of the volt-seconds applied to the transformer to zero at the end of each welding pulse, the residual secondary current is nulled. This alleviates magnetizing current problems which occur in multiple pulse welding.

5 Claims, 4 Drawing Figures

METHOD FOR CONTROLLING MAGNETIZING CURRENT IN MULTIPULSE RESISTANT WELDING

BACKGROUND

This invention relates to a resistant welding system and more particularly to a welding control system for eliminating magnetizing current transients in the primary of a welding transformer by reducing the residual currents in the secondary to zero at the end of each welding pulse in a multiplulse welding sequence.

In the current state of the art, the use of smaller welding transformers with sharply saturating iron cores has made the control of magnetizing current a matter of critical importance. The large capacity supply circuits and heavy conductors used in resistance welding allow extremely large magnetizing currents to flow when the transformer iron becomes saturated. This problem has long been solved for the "turn on" case where the first half cycle of the weld is carefully controlled to prevent saturation during the weld. At the end of the weld the welding electrodes (tips) are opened and the residual secondary current terminates. In cases where the tips do not open before the next welding pulse starts, the residual current biases the transformer iron sufficiently to cause a high magnetizing current to be drawn upon initiation of the next welding pulse. The high magnetizing current results in shorter transformer life, less current delivered to the workpiece and, voltage dips in the supply bus with resulting deleterious effects on other welders on the same supply bus which have welds in process.

SUMMARY

The foregoing problem is substantially solved by a method to control the welding transformer magnetizing current in which the residual magnetizing current in the transformer secondary is brought close to zero at the end of each welding pulse. This is accomplished by matching the volt-second areas above and below the zero voltage line and in particular adjusting the last one-half cycle to match the first half cycle of each welding pulse. For example, if the first half cycle of welding current is initiated at 85° after the zero crossing of the line voltage then the last half cycle of current in that welding pulse would be initiated at approximately 85° from the line voltage zero crossing. Note that the first and last half cycles are of opposite polarity because all weld pulses consist of an even number of half cycles.

Accordingly, a principal object of the present invention is to provide a method for eliminating the magnetizing current transients in the primary of the welding transformer upon initiation of a subsequent welding pulse by reducing the residual currents in its secondary to zero at the end of each pulse in a multipulse welding sequence through the steps of determining the last half cycle in each pulse; and adjusting the delay angle of current initiation of the last half cycle so that the algebraic sum of the volt-second integrals of each pulse is approximately equal to zero.

These and other objects, advantages and features of the present invention will become apparent from the detailed description of the preferred embodiment wherein reference is made to the accompanying drawings illustrating the preferred embodiment of the invention.

DETAILED DESCRIPTION OF THE PREFERRED EMBODIMENT

Figure 3:
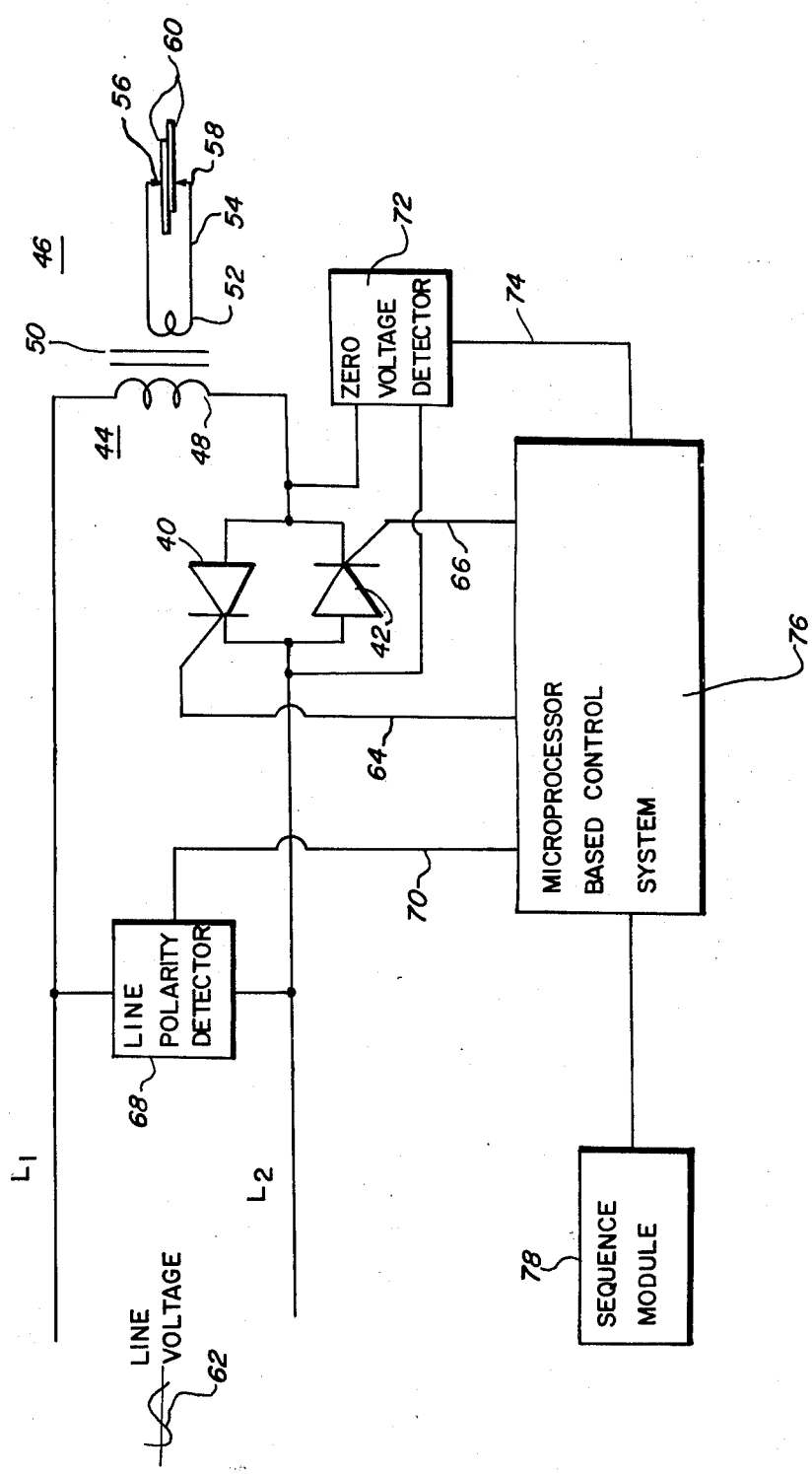

Referring now to FIG. 1a of applicant's invention, a line voltage waveform 1 and a typical tip current waveform 2 occurring during a three cycle weld pulse. FIG. 1b is a waveform 3 of the voltage impressed on the transformer primary. Voltage is present only during the time that current flows in 1a as shown by waveform 2. Turning now to FIG. 3, a pair of inversely connected SCR welding contactors 40 and 42 are used to control the current delivered to a primary circuit 44 of a welding transformer 46, including a primary winding 48, an iron core 50, a secondary winding 52 and a secondary circuit 54. The secondary circuit 54 further includes a pair of welding electrodes 56 and 58 with work pieces 60 clamped therebetween for a typical spot weld of the type used in the automotive industry.

The primary winding 48 of the welding transformer 46 is connected across lines L1 and L2, respectively, which, in turn, are connected to the line voltage source 62 of any known value for resistance welding. Initiation of current conduction through the SCR welding contactors 40 and 42 is controlled by SCR gate signals on conductors 64 and 66, respectively, which signals are fed to the gates of the SCR welding contactors 40 and 42. The line voltage polarity is determined by a polarity detector circuit 68, which, for the purpose of this embodiment, can be considered to produce an output signal of a logic one on a conductor line 70 when the voltage on line L1 is positive with respect to line L2. Similarly, an output signal of logic zero is produced on conductor line 70 when line L1 is negative with respect to line L2. Thus, the line polarity detector 68 senses the transition of line voltage from a positive to a negative half cycle as it crosses the zero voltage line. The state of conduction of the SCR welding contactors 40 and 42 is determined by an automatic power factor (APF) circuit 72, as described in the '724 patent. The APF circuit 72 senses the voltage across the SCR welding contactors 40 and 42 and produces a logic zero output on a conductor lne 74 when voltage is present across the SCR welding contactors 40 and 42 (this corresponds to the non-conduction state of the contactors 40 and 42). If a nominal voltage is present across the SCR welding contactors 40 and 42, the welding contactors 40 and 42 are conducting and the APF circuit 72 generates a logic one output on conductor line 74. Both of the output signals on conductor lines 70 and 74 are fed to a microprocessor based control system 76 of the type described in the '724 patent which is an 8-bit microprocessor of any known type, such as Motorola M6800, as its main control element. The transition of the line voltage from a positive to a negative value produces a polarity signal corresponding to the zero crossing of line voltage on line conductor 70.

The microprocessor system 76 consisting of the 8-bit Motorola M6800 microprocessor and its associated memory and various insulator devices receives the line voltage polarity information on line 70, as well as the state of conduction of the SCR welding contactors 40 and 42 on line conductor 74. Then the microprocessor system 76 generates appropriately timed SCR welding contactor gate signals on line 64 and 66 and feeds these gate signals to the gates of the SCR welding contactors 40 and 42 based on operator input data stored in a sequence module 78, such as the desired welding current, duration of the weld, etc, as fully described in the '724 patent.

It is pointed out in the '724 patent the phase shift heat control therein is essentially a timing fuction. Timing for the digital phase shift heat control of the welding controller therein proceeds from the end of the current conduction of the previous half cycle of welding current to the firing point for the next half cycle of current, as shown in FIG. 8C of the '724 patent. The first half cycle of the weld is usually fired at 85 degrees after the zero crossing of the voltage waveform. After the first half cycle, all succeeding half cycles are referenced to the end of the current conduction of the previous half cycle. In this type of application, the microprocessor of the '724 patent, as well as the microprocessor in this invention, is a digital timer. This digital phase shift heat control for the welding controller is done by taking advantage of the fact that the time it takes for the microprocessor to execute a particular instruction is both fixed and known. The time delay is made by placing the microprocessor in a program loop immediately after the end of the current conduction of the previous half cycle. The number of times the microprocessor goes through this loop determines the actual time delay before the next half cycle of welding current is initiated. The number of times the microprocessor enters this loop is stored in a location in the microprocessor's memory. The time delay generated corresponds to the delay angle or gap between half cycles of current conduction 2, as shown in FIG. 1A. The above use of the processor cycles for timing purposes is taught in greater detail in column 14, line 30 through 68 and column 15, line 1 through 59, in the '724 patent.

The magnetizing current of a transformer is known to be proportional to the volt-second integral of the applied voltage such as the area A in FIG. 1b. The volt-second integral is defined as the area under the voltage vs. time curve. An area such as B is considered negative as it causes a current flow opposite to that caused by area A. The magnitude and the direction of the magnetizing current is related to the algebraic sum of the areas $A-B-C+D$, etc., that have been impressed upon the transformer. The magnetizing current can be brought to zero at the end of the welding pulse by adjusting the area K-L such that the sum of all the areas equals zero. In the case shown, the areas:

$$A+D+E+H+I+L-(B+C+F+G+J+K)=0$$

In some cases, the intervening cycles between the first and last half cycles are fully cancelling and in that event, it is only necessary to match the last one half cycle to the first one half cycle by initiating them both at the same angle from their zero crossing. In those cases where an even number of identical half cycles are used in the weld pulse, all of the half cycles except the first and the last are self-cancelling. That is:

$$D+E+H+I-(C+F+G+J)=0.$$

Then it is only necessary to match the last half cycle in a weld pulse to the first half cycle by initiating them both at the same delay angle from their respective voltage zero crossings.

By extension of the above example where the undisturbed half cycles are self-cancelling, any half cycle following the first half cycle could be used to accomplish the zeroing of the total volt-second integral of each weld pulse. If a half cycle of polarity opposite to the first half cycle were selected, it would have to be initiated with the same delay angle from the voltage zero crossing as the first half cycle. Then, typically, the remaining half cycles in that weld pulse will be self-cancelling. If a half cycle of the same polarity as the first half cycle were selected, its initiation delay would be chosen to complement that of the first half cycle in such a way that the average volt-second integral of the first half cycle and the selected half cycle will be equal in magnitude of the volt-second integral of any of the other half cycles.

Futhermore, zeroing of the volt-second integral summed over a weld pulse of a predetermined number of half cycles can be accomplished by making appropriate changes in the initiating angle of any number of half cycles following, of course, the first half cycle.

In the embodiment of this invention, the last half cycle only is adjusted to bring about the zeroing of the volt-second integral. However, any of the above-mentioned means of alternating any particular half cycle in a weld pulse would serve the same purpose as well, provided that the total volt-second integral is brought to zero by the time that the last half cycle is completed in any particular weld pulse containing any predetermined number of half cycles dependent upon the heat desired in that particular weld.

Figure 1:
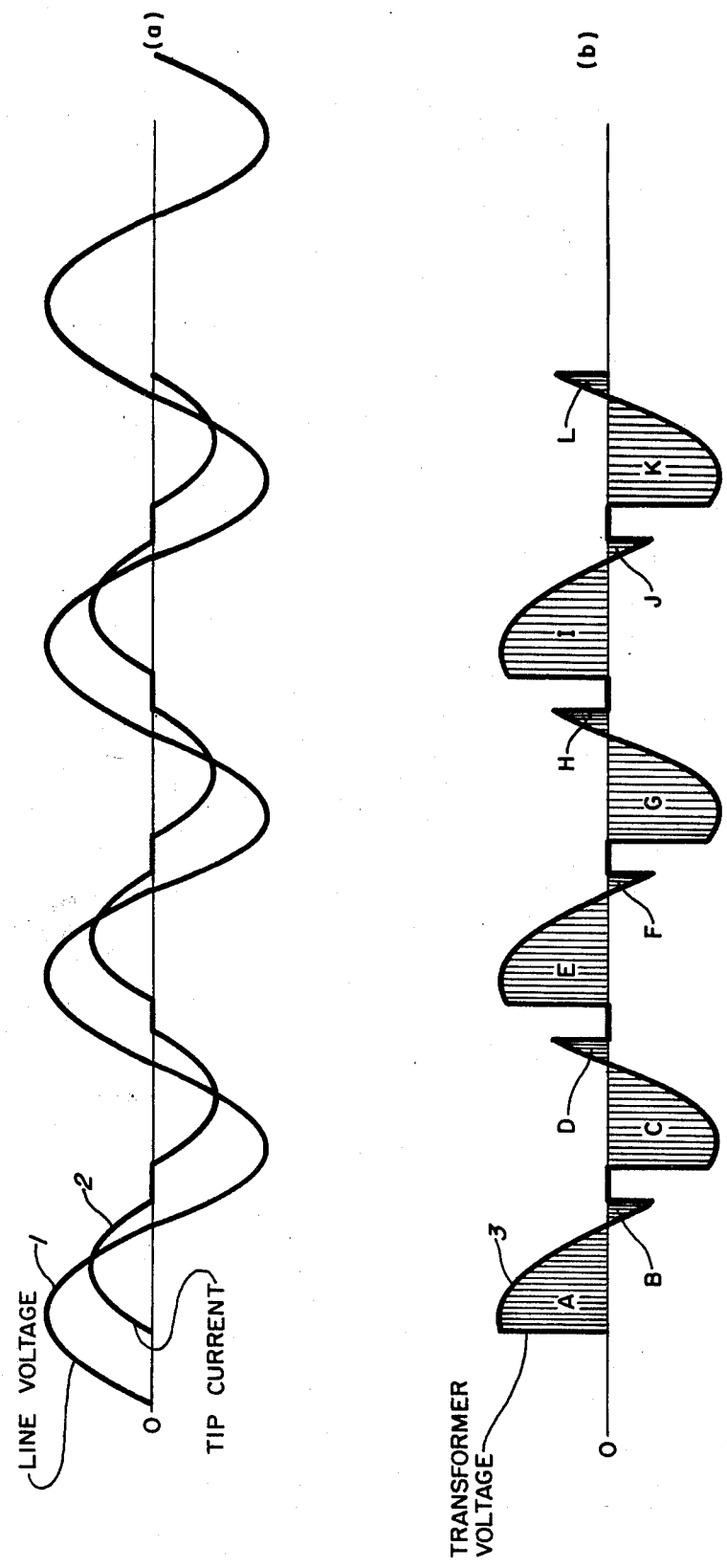
FIGS. 1a–1b show current and voltage versus time diagrams which serve to explain the present invention.

Typically, in multipulse applications, the tips are not opened between pulses and thus any residual magnetizing current continues to flow in the secondary circuit. If this current is not brought to zero at the end of each welding pulse, that is, the algebraic sum of the volt-second areas as shown in FIG. 1 is not brought to zero, it will add to the magnetizing current of the subsequent welding pulse which will force the transformer core into saturation and allow a large transient current to flow. As an example, 10 amperes of residual current may allow a 1000 ampere transient current spike to develop in the primary winding upon initiation of the next welding pulse. These transient currents shorten transformer and contactor lifetime as well as effect other welders operating on the same power bus.

Figure 2:
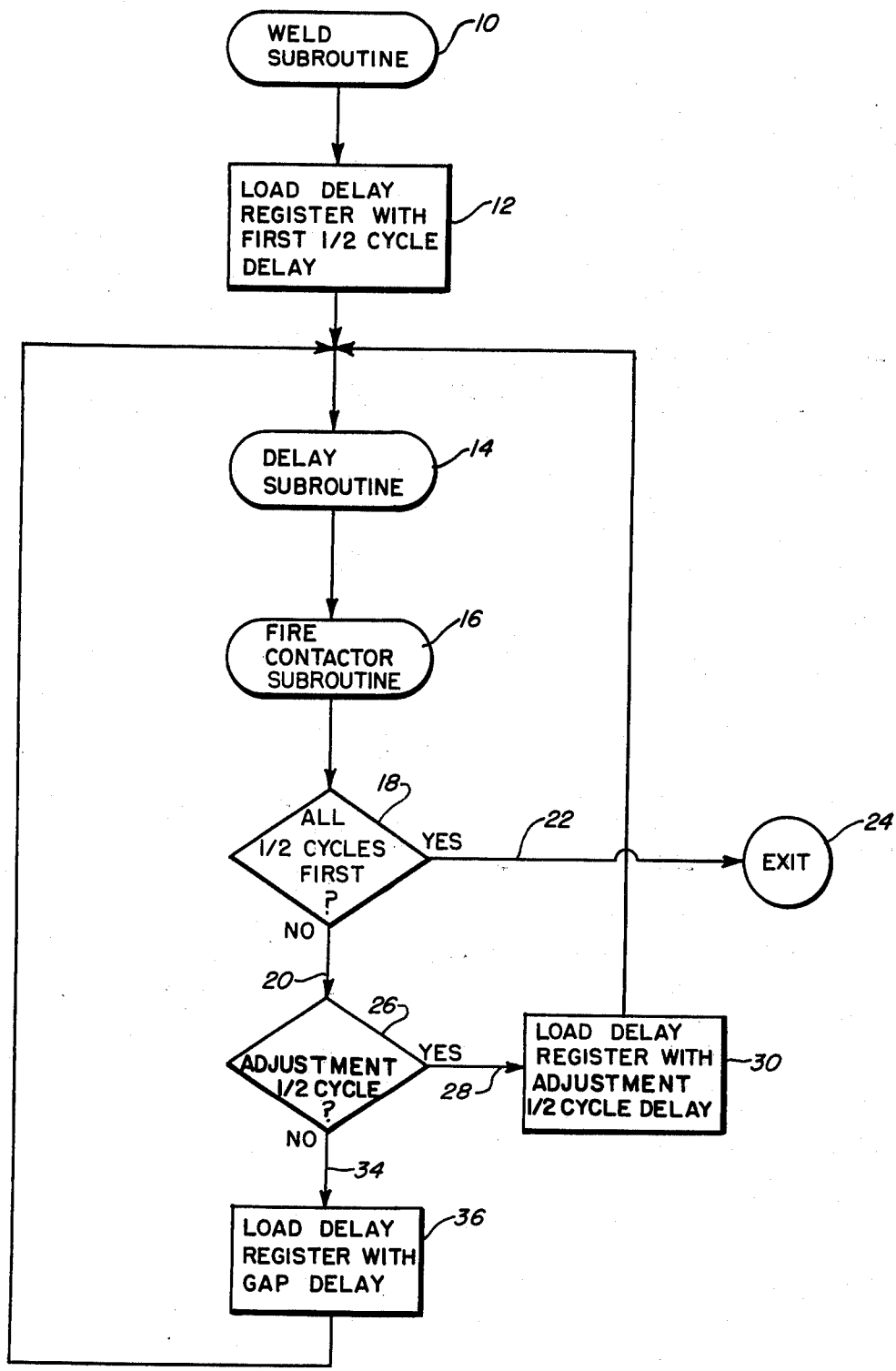
FIG. 2 is a block diagram of the flow chart of the preferred embodiment of the present invention; and, FIG. 3 is a partial block and schematic diagram for the resistance welding system according to the present invention utilizing a microprocessor as its main control element.

Turning now to FIG. 2, the implementation of adjusting the area K-L so that the algebraic sum of the areas of any one welding pulse are equal to zero is accomplished by a series of steps in the software program which senses when the last one half cycle is to be fired and then causes an appropriate delay to occur from the line voltage zero crossing to a point of initiation of the last one half cycle. Note firing means initiation of conduction through the contactor device and welding transformer. These series of steps are added to the weld routine contained in the read only memory of a digital welder control system as described in U.S. Pat. No. 4,104,724, Digital Welder Control System, which is herein incorporated by reference thereto. The time delays mentioned herein are generated by a means as fully described in the above U.S. Patent.

A Weld Subroutine 10 if FIG. 2 contains the following functional blocks:

Functional block 12—Deposits a number proportional to the desired delay angle for initiating the first ½ cycle of the welding pulse into the delay register of the microprocessor.

Delay block 14—Takes the number from the delay register and provides a time delay from the line voltage zero crossing to the initiation of current.

Fire contactor block 16—supplies the appropriate signals to initiate conduction of the contactor.

Decision block 18—Determines if the last one-half cycle of the welding pulse has been fired and branches as shown in FIG. 2.

Decision block 26—Determines if the adjustment one-half cycle is about to be fired and branches as shon in FIG. 2.

Functional block 30—Deposits a number proportional to the desired delay angle for initiating the adjustment one-half cycle of the welding pulse into the delay register of the microprocessor.

Functional block 36—Deposits a number proportional to the delay required to achieve the desired current as preset by the machine operator into the delay register. This is referred to as the gap delay.

Exit 24—The normal exit from the Weld Subroutine 10 taken by the miroprocessor.

Upon initiating a welding pulse the microprocesser enters a Weld Subroutine 10 and proceeds to set up a proper time delay 12 to fire the first one-half cycle in a manner that will avoid the "turn on" transient, this is a fixed time delay of 85° or a variable time delay dependent on the current setting for weld and other factors. Proceeding then to a Delay Subroutine 14 which provides a real time delay proportional to the value of a number preset in a register as is carried out in block 12 and others. Upon completion of the time delay, the microprocessor goes to a firing routine 16 which starts the flow of current to the welding transformer.

Next, the microprocessor determines if all one-half cycles programmed have been fired in Decision block 18. If so, via yes logic line 22, the microprocessor exits the Weld Subroutine through Exit block 24. If not, via no logic line 20, the microprocessor determines if it is about to fire the adjustment one-half cycle of the welding pulse represented by block 26. If so, via yes logic line 28 is proceeds to Functional block 30 which presets the delay register for an appropriate firing point to cause the sum of the areas of FIG. 1b to be brought to zero. It then proceeds to Delay block 14, Fire Contactor block 16, Decision block 18, yes line 22 to Exit block 24. If no, via no logic line 20, it proceeds to place the programmed gap delay in the delay register 36 and then onto Delay block 14 to repeat the process until Decision block 26 results in a yes decision.

While in the foregoing there has been described a presently preferred embodiment of the present invention, it should be understood that this embodiment is merely illustrative of this invention and that other embodiments may be made without departing from the true spirit and scope of this invention. For example, this method for eliminating magnetizing current transients is certainly applicable to any saturable iron cored electromagnetic device which is capable of storing residual currents in magnetically linked current carrying loops.

I claim:

1. In a control system for eliminating magnetizing current transients in a saturable iron cored electromagnetic device by reducing stored total residual currents, known to be proportional to the volt-second integral of an applied voltage on said device, in magnetically linked current carrying loops to zero at the end of an energizing pulse consisting of a predetermined and equal number of positive and negative half cycles of current having a first and last half cycle in a multipulse operating sequence, a method of controlling an iron cored electromagnetic device comprising the steps of:
   determining at least one adjustment half cycle after the first half cycle in each pulse; and
   adjusting the initiation and duration of said adjustment half cycle of current in each pulse so that the algebraic sum of the volt-second integrals at the end of each pulse is approximately equal to zero.

2. In a control system for eliminating magnetizing current transients in a saturable iron cored electromagnetic device by reducing stored total residual currents, known to be proportional to the volt-second integral of an applied voltage on said device, in magnetically linked current carrying loops to zero at the end of each energizing pulse consisting of a predetermined equal number of positive and negative half cycles of current having a first and last half cycle in a multipulse operating sequence, a method of controlling an iron cored electromagnetic device comprising the steps of;
   determining the last half cycle in each pulse; and
   adjusting the delay angle of current initiation of the last half cycle so that the algebraic sum of the volt-second integrals at the end of each pulse consisting of said equal number of positive and negative half cycles of current is approximately equal at zero.

3. In a control system for eliminating magnetizing current transients in the primary of a transformer by reducing the residual currents, known to be proportional to the volt-second integral of an applied voltage on said transformers, in its secondary to zero at the end of each energizing pulse consisting of a predetermined and equal number of positive and negative half cycles of current having a first and last half cycle in a multipulse operating sequence, a method of controlling a transformer comprising the steps of:
   determining the last half cycle in each pulse; and
   adjusting the initiation and duration of the other half cycles after the first half cycle in each pulse so that the algebraic sum of the volt-second integrals at the end of each pulse is approximately equal to zero.

4. In a control system for eliminating magnetizing current transients in the primary of a transformer by reducing the residual currents, known to be proportional to the volt-second integral of an applied voltage on said transformer, in its secondary to zero at the end of each energizing pulse consisting of a predetermined and equal number of positive and negative half cycles of current in a multipulse operating sequence, a method of controlling a transformer comprising the steps of:
   determining at least one adjustment half cycle after the first half cycle in each pulse; and
   adjusting the delay angle of current initiation of the adjustment half cycle so that the algebraic sum of the volt-second integrals at the end of each pulse is approximately equal to zero.

5. In a resistance welding system having a welding transformer with a primary and secondary winding operating in a multipulse sequence, each pulse consisting of a predetermined and equal number of positive and negative half cycles of current having a first and last half cycle, a microprocessor as its main control element, a method of eliminating the magnetizing current transients in the primary winding by reducing the residual currents, known to be proportional to the volt-second integral of an applied voltage on said transformer, in the secondary winding to zero at the end of each pulse comprising the steps of:

selecting a suitable delay angle to fire the first half cycle of current conduction in each pulse;

utilizing the known cycling time of the microprocessor to execute a particular instruction to generate a time delay corresponding to the suitable delay angle;

determining the last half cycle of current conduction in each pulse by having the microprocessor counting the initiated half cycles in each pulse;

adjusting the delay angle of the current initiation of the last half cycle so that the algebraic sum of the volt-second integrals of each pulse is approximately equal to zero; and firing a control means responsive to the time delay and count of half cycles for initiating the last half cycle of current conduction.

* * * * *